Feb. 7, 1939.  L. C. DOYLE  2,146,289
BALL BEARING TROLLEY
Filed July 20, 1938
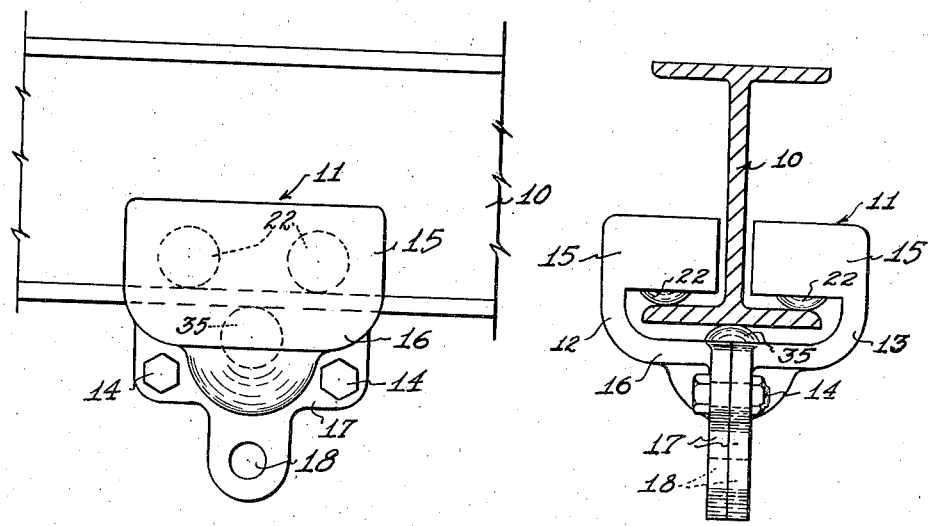
Fig. 1
Fig. 2
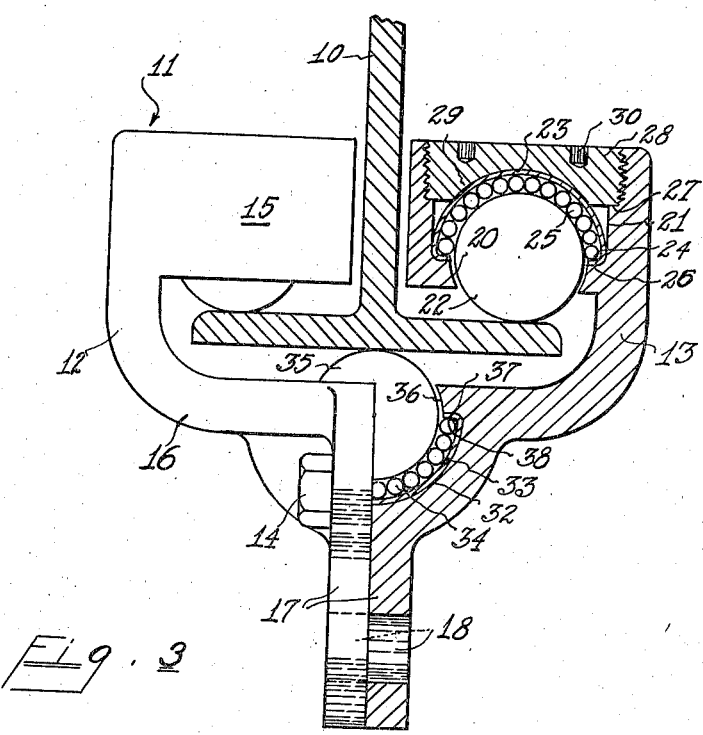
Fig. 3
INVENTOR.
Lowell C. Doyle
BY Daniel G. Cullen
ATTORNEY.

Patented Feb. 7, 1939

2,146,289

UNITED STATES PATENT OFFICE 2,146,289

BALL BEARING TROLLEY

Lowell C. Doyle, Salina, Kans.

Application July 20, 1938, Serial No. 220,217

1 Claim. (Cl. 105—153)

This application relates to trolleys and particularly to trolleys adapted to travel on supports and carry loads. The trolleys may or may not be combined with link chain mechanism to make a travelling conveyor, as desired.

The object of the invention is to increase the efficiency of such trolleys by arranging them so that they may glide freely along the track.

The invention resides in the means by which these advantages are attained, as will be hereinafter described and definitely set out in the claim.

In the drawing,

Fig. 1 is a side elevation of my trolley, supported on a suitable I-beam;

Fig. 2 is an end view of the same;

Fig. 3 is an enlarged sectional end view of the same.

Referring to the parts by reference numerals, 10 represents an I-beam support on whose lower flange the trolley 11 rides. The trolley is shown as composed of a pair of members 12—13 extending onto opposite sides of the I-beam and connected together beneath the I-beam as by means of bolts 14. The trolley may thus be described as being generically of a U-shape, as shown. It has inwardly directed portions 15 which are opposite the web of the I-beam. At their lower edges these portions 15 continue downwardly and then inwardly to form the bight 16 of the U and then downwardly again to provide portions 17 through which pass the bolts 14. The portions 17 have alined holes 18 for forming a suitable supporting eye or link chain connecting eye. This is to be taken as illustrative of any load supporting arrangement of the trolley.

Each of the portions 15 is formed with a hole 20 having a counterbore portion 21. In the holes 20 are seated large size glider balls 22 surmounted by hemispherical caps 23 having inturned flanges 24 and containing many small size roller balls 25, sufficient to fill the hemispherical caps 23. The flanges 24 of the caps seat and bear against the shoulders 26 of the counterbores 21. On other shoulders 27 of such counterbores seat and bear nuts 28 having curved lower surfaces 29 receiving the caps 23 and thus forming retainers for the parts within the holes of the portions 15. The nuts have holes 30 for receiving lugs of spanner wrenches or the like whereby they may be turned for facilitating removal of the parts.

At the juncture of the portions 16 and 17, and in the bight of the U, the members 12—13 are scooped out to provide curved seats 32 for a hemispherical cap 33 containing a plurality of small size roller balls 34 and a large size glider ball 35 seated within the seats 32 formed by the hollowing out of the members 12—13 and in the hole 36 formed by the inwardly directed shoulders 37 at such points. The inturned flange 38 of the cap 32 seats and bears against the shoulders 37 at the hole 36.

The three glider balls 22, 35 provide a glide roller arrangement for the trolley and the mounting of these glider balls in the trolley by means of small roller balls 25, 34 provides a frictionless roller bearing for the glider balls.

The construction herein disclosed is extremely simple and is capable of being embodied in a very compact form, as shown. It may be used with any suitable supporting structure, as for example the I-beam shown, or any other beam, as for example an inverted T-beam, angle brackets forming a T-beam, etc. It may be used for any desired purpose, load carrying, conveyors, etc.; and it may be used individually or in multiple, as if connected to links of any type of link chain, etc.

Having thus described my invention, I claim:

A trolley generally of U-shape and comprising two connected members having inwardly directed portions at the ends of the U, each of these having therein a hole, the bight of the U also having therein a hole, large size glider balls in the holes, hemispherical caps in the holes, the caps being filled and lined with a large number of small size roller balls disposed in the spaces between the glider balls and the caps, nuts in the two holes of the inwardly directed portions of the trolley for retaining the caps, roller balls, and glider balls in the holes, each cap having an inwardly directed marginal annular flange confining the roller balls therein and seating against an annular shoulder of each hole, and screw bolts fastening the connected members together and thus retaining, in the hole of the bight of the U, the cap, roller balls, and glider ball therein.

LOWELL C. DOYLE.